US012567769B2

(12) United States Patent
Bharadwaj et al.

(10) Patent No.: US 12,567,769 B2
(45) Date of Patent: Mar. 3, 2026

(54) DUAL-MODE ANTENNA WITH NON-UNIFORM COIL ARRAY FOR WIRELESS POWER TRANSMISSION AND METHOD THEREOF

(71) Applicant: Indian Institute Of Technology Ropar, Punjab (IN)

(72) Inventors: M. Ananth Bharadwaj, Punjab (IN); Vivek Kumar Srivastava, Punjab (IN); Ashwani Sharma, Punjab (IN); C.C. Reddy, Punjab (IN)

(73) Assignee: Indian Institute Of Technology Ropar, Punjab (IN)

( * ) Notice: Subject to any disclaimer, the term of this patent is extended or adjusted under 35 U.S.C. 154(b) by 158 days.

(21) Appl. No.: 18/552,310

(22) PCT Filed: Mar. 22, 2022

(86) PCT No.: PCT/IN2022/050281

§ 371 (c)(1),
(2) Date: Sep. 25, 2023

(87) PCT Pub. No.: WO2022/201191

PCT Pub. Date: Sep. 29, 2022

(65) Prior Publication Data

US 2024/0178704 A1 May 30, 2024

(30) Foreign Application Priority Data

Mar. 25, 2021 (IN) .............................. 202111013157

(51) Int. Cl.
| | |
|---|---|
| *H02J 50/40* | (2016.01) |
| *H02J 50/23* | (2016.01) |
| *H02J 50/90* | (2016.01) |

(52) U.S. Cl.
CPC ............ *H02J 50/402* (2020.01); *H02J 50/23* (2016.02); *H02J 50/90* (2016.02)

(58) Field of Classification Search
CPC ........... H02J 50/40; H02J 50/402; H02J 50/90
See application file for complete search history.

(56) References Cited

U.S. PATENT DOCUMENTS

| | | | | |
|---|---|---|---|---|
| 2012/0187773 A1* | 7/2012 | Wechlin | .................. | H02J 7/342 |
| | | | | 307/104 |
| 2013/0154383 A1* | 6/2013 | Kasturi | .................. | H04B 5/263 |
| | | | | 307/104 |

(Continued)

FOREIGN PATENT DOCUMENTS

WO          2019/203990          10/2019

OTHER PUBLICATIONS

International Search Report and Written Opinion dated Jul. 20, 2022 from corresponding PCT Application No. PCT/IN2022/050281.

*Primary Examiner* — Rexford N Barnie
*Assistant Examiner* — Rasem Mourad
(74) *Attorney, Agent, or Firm* — ArentFox Schiff LLP

(57) ABSTRACT

Dual-mode transmitter antenna with non-uniform coil array for wireless power transmission is disclosed. The dual mode antenna comprises a primary coil located at center of the dual-mode transmitter antenna and configured to generate concentrated uniform magnetic field in a first mode and a second mode of operation. The dual mode antenna further comprises a plurality of secondary coils surrounding the primary coil and located at the periphery of the dual-mode transmitter antenna, and a switching circuit electrically coupled to the primary coil and the plurality of the secondary coils. The switching circuit is configured to detect a lateral misalignment between the dual-mode transmitter antenna and a receiver antenna and activate the plurality of secondary coils in the second mode of operation in response to (Continued)

detecting lateral misalignment between the dual-mode transmitter antenna and the receiver antenna. The plurality of secondary coils are configured to generate an extensive uniform magnetic field.

10 Claims, 7 Drawing Sheets

(56)                    References Cited

U.S. PATENT DOCUMENTS

| | | | |
|---|---|---|---|
| 2014/0143933 A1 | 5/2014 | Low et al. | |
| 2014/0183967 A1* | 7/2014 | Ryu | H02J 50/80 |
| | | | 307/104 |
| 2015/0115727 A1 | 4/2015 | Carobolante et al. | |
| 2018/0097404 A1* | 4/2018 | Park | H02J 50/90 |
| 2020/0212721 A1* | 7/2020 | Narayana Bhat | H02J 50/402 |
| 2020/0403449 A1 | 12/2020 | Elkhouly et al. | |
| 2021/0082617 A1* | 3/2021 | Varghese | H02J 50/005 |

* cited by examiner

200

300

305

400

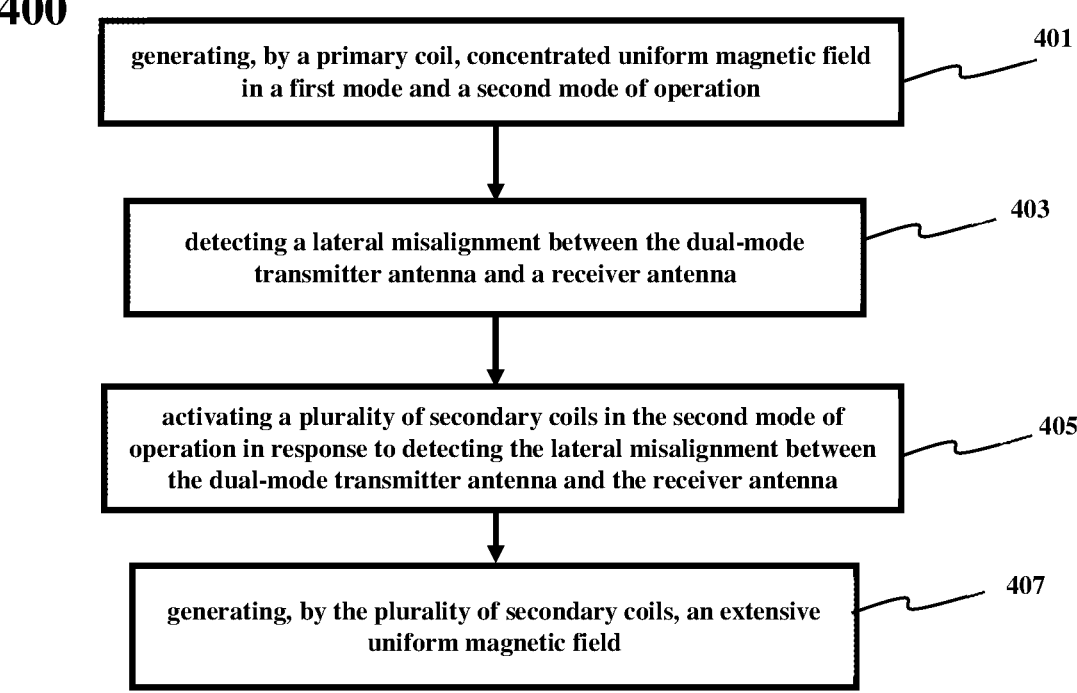

generating, by a primary coil, concentrated uniform magnetic field in a first mode and a second mode of operation                    401 detecting a lateral misalignment between the dual-mode transmitter antenna and a receiver antenna                    403 activating a plurality of secondary coils in the second mode of operation in response to detecting the lateral misalignment between the dual-mode transmitter antenna and the receiver antenna                    405 generating, by the plurality of secondary coils, an extensive uniform magnetic field                    407

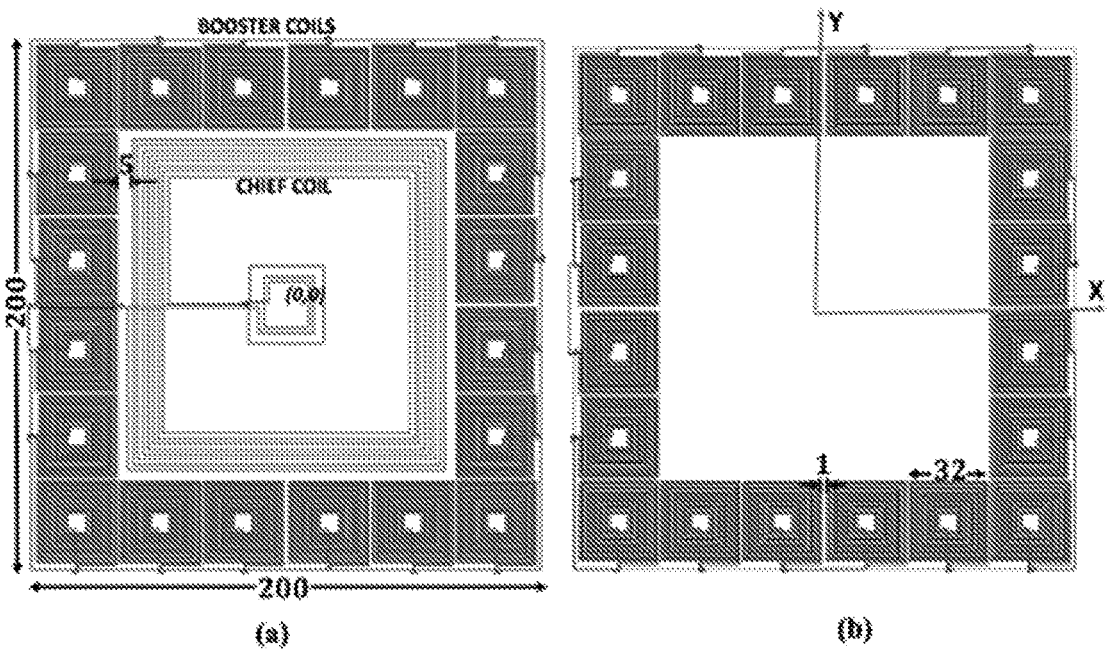
(a)        (b)
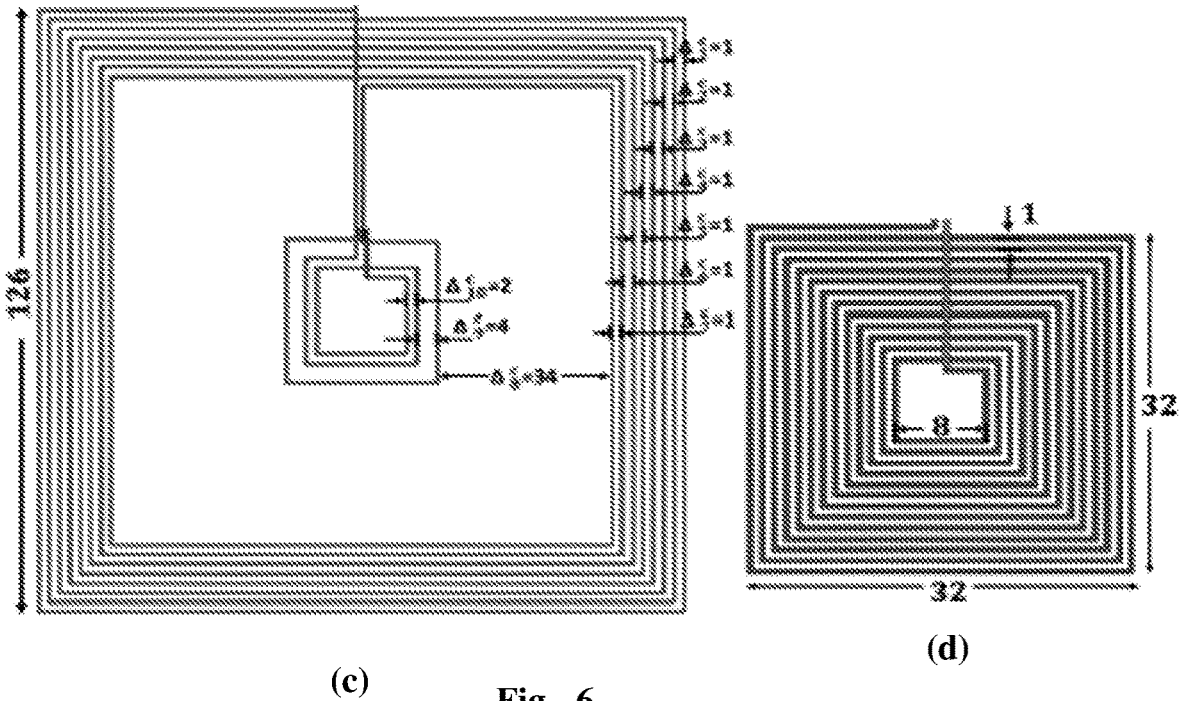
(c)      Fig.- 6      (d)

DUAL-MODE ANTENNA WITH NON-UNIFORM COIL ARRAY FOR WIRELESS POWER TRANSMISSION AND METHOD THEREOF

CROSS-REFERENCE TO RELATED APPLICATIONS

This application is U.S. National Stage entry under 35 U.S.C. § 371 based on International Application PCT/ IN2022/050281, filed on Mar. 22, 2022, which claims the benefit of priority to IN patent application No. 202111013157, filed Nov. 25, 2021, which are incorporated herein by reference in their entireties.

TECHNICAL FIELD

The present disclosure relates to wireless power transmission in wireless charging applications.

BACKGROUND

Traditionally, wireless power transfer (WPT) system consists of a transmitter (Tx) and a receiver (Rx) coupled through one of the various techniques which are broadly classified into inductive power transfer (IPT) and magnetic resonance coupling (MRC). The MRC technique provides a highly efficient energy transmission over a larger distance when compared to IPT.

Hence, MRC became a widely used technique for medium-range WPT applications. Since then, several investigators have worked on the development of an efficient MRC technique by focusing on design of various geometrical spiral coil antennas.

The performance of these WPT systems are greatly affected by misalignment between a transmitter (Tx) and a receiver (Rx) coils. In practice, a perfect alignment is usually not ensured. Therefore, mitigation of the misalignment problem is currently a major research direction. The lateral misalignment problem is most common in the WPT applications, where the Tx and the Rx coils are co-planar, i.e., smart phone and electric vehicle charging applications.

The lateral misalignment usually occurs when there is a displacement between the Tx and the Rx coils. The displacement between the Tx and the Rx coils degrades mutual inductance (M) which reduces the overall power transfer efficiency (PTE).

Presently, sensing coils are used to detect the lateral displacement of the Rx-coil which is corrected by using an electro-mechanical arrangement. The main limitation of this technique is involvement of mechanical motions which makes the system unreliable, inefficient, and cost ineffective.

A widespread uniform H-field distribution in the Rx-plane is another technique used to mitigate lateral misalignment. The major drawback of this technique is that under the perfectly aligned condition there is a significant leakage of magnetic flux, which degrades the PTE of the WPT system.

In some application a quasi-uniform H-field is formed to mitigate the misalignment problem. In this technique, a complex switching circuit consisting of multiple states is required to trigger the aligned Tx module which is a sub-set of the Tx array based on a negative H-field. The disadvantage of this technique is that the size of the Tx-array is large in comparison to Rx-coil and is not efficient for the applications such as electrical vehicles (EVs) and mobile devices as the ratio of the size of the Rx-coil to the Tx-coil is relatively large.

Thus, there is need of the technique that overcome the above-mentioned drawbacks/fulfils the above needs and that mitigates lateral misalignment problem discussed above.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a dual-mode transmitter antenna with non-uniform coil array for wireless power transmission is disclosed. The dual mode antenna comprises a primary coil located at center of the dual-mode transmitter antenna and the primary coil is configured to generate concentrated uniform magnetic field in a first mode and a second mode of operation. The dual mode antenna further comprises a plurality of secondary coils surrounding the primary coil and located at the periphery of the dual-mode transmitter antenna and a switching circuit electrically coupled to the primary coil and the plurality of the secondary coils. The switching circuit is configured to detect a lateral misalignment between the dual-mode transmitter antenna and a receiver antenna and activate the plurality of secondary coils in the second mode of operation in response to detecting lateral misalignment between the dual-mode transmitter antenna and the receiver antenna. The plurality of secondary coils are configured to generate an extensive uniform magnetic field.

In yet another non-limiting embodiment of the present disclosure, the dual-mode transmitter antenna is operated in the first mode if the dual-mode transmitter antenna and receiver antenna are perfectly aligned in lateral direction, and the dual-mode transmitter antenna is operated in the second mode if the lateral misalignment between the dual-mode transmitter antenna and the receiver antenna is detected. The plurality of secondary coils are connected in series with the primary coil when the dual-mode transmitter antenna is operated in the second mode.

In yet another non-limiting embodiment of the present disclosure, each of the plurality of secondary coils comprise uniformly distributed turns to intensify a magnitude of the magnetic field near the boundary of the dual-mode transmitter antenna in the second mode.

In yet another non-limiting embodiment of the present disclosure, the primary coil comprises non-uniformly distributed turns along with anti-parallel turns for generating the concentrated uniform magnetic within a receiver antenna region.

In yet another non-limiting embodiment of the present disclosure, the switching circuit is further configured to deactivate the plurality of secondary coils upon detecting that the dual-mode transmitter antenna and the receiver antenna are perfectly aligned in lateral direction.

In yet another non-limiting embodiment of the present disclosure, a method for wireless power transmission is disclosed. The method comprises step of generating, by a primary coil, concentrated uniform magnetic field in a first mode and a second mode of operation. The primary coil is located at the center of a dual-mode transmitter antenna. The method further comprises the step of detecting a lateral misalignment between the dual-mode transmitter antenna and a receiver antenna and activating a plurality of secondary coils in the second mode of operation in response to detecting the lateral misalignment between the dual-mode transmitter antenna and the receiver antenna. The plurality of secondary coils surrounds the primary coil and located at the periphery of the dual-mode transmitter antenna. The method further comprises the step of generating, by the plurality of secondary coils, an extensive uniform magnetic field.

In yet another non-limiting embodiment of the present disclosure, the method further comprises operating the dual-mode transmitter antenna in the first mode if the dual-mode transmitter antenna and receiver antenna are perfectly aligned in lateral direction and operating the dual-mode transmitter antenna in the second mode if the lateral misalignment between the dual-mode transmitter antenna and the receiver antenna is detected. The step of activating the plurality of secondary coils in the second mode of operation comprises connecting the plurality of secondary coils in series with the primary coil.

In yet another non-limiting embodiment of the present disclosure, the step of generating the extensive uniform magnetic field comprises intensifying a magnitude of magnetic field near the boundary of the dual-mode transmitter antenna in the second mode of operation using uniformly distributed turns of each of the plurality of secondary coils.

In yet another non-limiting embodiment of the present disclosure, the step of generating the concentrated uniform magnetic field comprises generating concentrated uniform magnetic field within a receiver antenna region using non-uniformly distributed turns along with anti-parallel turns of the primary coil.

In yet another non-limiting embodiment of the present disclosure, the method further comprises step of deactivating the plurality of secondary coils when the dual-mode transmitter antenna and the receiver antenna are perfectly aligned in lateral direction.

The foregoing summary is illustrative only and is not intended to be in any way limiting. In addition to the illustrative aspects, embodiments, and features described above, further aspects, embodiments, and features will become apparent by reference to the drawings and the following detailed description.

Objective

The primary objective of the present invention is to mitigate lateral misalignment problem between the transmitter and receiver coil in WPT applications.

Another objective of the present invention is to increase power transfer efficiency (PTE) of the WPT system without increasing the size of the transmitter antenna.

Further objective of the present invention is to reduce wastage of flux when the dual mode transmitter antenna is perfectly aligned with the receiver antenna.

BRIEF DESCRIPTION OF THE ACCOMPANYING DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying figures, in which:

FIG. 3(*b*) shows a block diagram of a switching circuit, in accordance with an embodiment of the present disclosure;

FIG. 4 shows a flow chart illustrating an exemplary method for wireless power transmission, in accordance with an embodiment of the present disclosure;

FIG. 6(*a*) shows a dual-mode transmitter antenna layout from front view, in accordance with an embodiment of the present disclosure;

FIG. 6(*b*) shows a dual-mode transmitter antenna layout from back view, in accordance with an embodiment of the present disclosure;

FIG. 6(*c*) shows a layout of a primary coil, in accordance with an embodiment of the present disclosure;

FIG. 6(*d*) shows a layout of a secondary coil, in accordance with an embodiment of the present disclosure;

Figure 1:
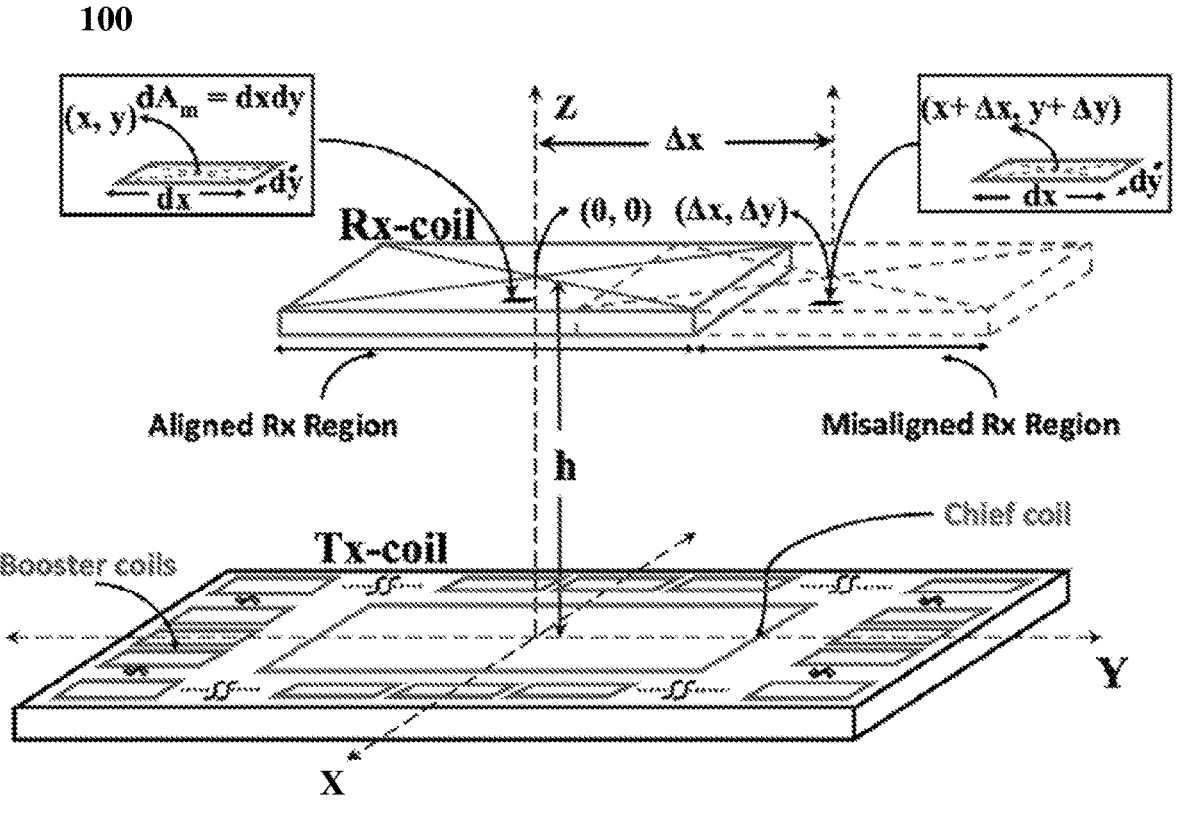
FIG. 1 shows an exemplary two-coil wireless power transfer system under lateral misalignment, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject-matter described herein as "exemplary" is not necessarily to be construed as preferred or advantageous over other embodiments.

While the disclosure is susceptible to various modifications and alternative forms, specific embodiments thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure will be described herein below with reference to the accompanying drawings. In the following description, well known functions or constructions are not described in detail since they would obscure the description with unnecessary detail.

FIG. 1 shows an exemplary two-coil wireless power transfer (WPT) system 100 under lateral misalignment, in accordance with an embodiment of the present disclosure.

In one non-limiting embodiment of the present disclosure, two-coil WPT system 100 may comprise a transmitter (Tx) antenna having Tx-coil and receiver (Rx) antenna having a Rx-coil. The Tx antenna is a dual-mode transmitter antenna. The Tx-coil may comprise a primary or chief coil and a plurality of secondary coil or the booster coils. The primary coil is present at the center of the Tx-coil and the plurality of secondary coil are located at the periphery of the dual-mode transmitter antenna.

In one embodiment of the present disclosure, the receiver antenna may be considered to be perfectly aligned with the transmitter antenna, if the Rx-coil (at coordinates (0,0)) of the receiver antenna is exactly above the primary coil of the transmitter antenna. The receiver antenna may be considered to be misaligned with the transmitter antenna, if the Rx-coil is displaced by value $\Delta x$ and $\Delta y$ with respect to the primary coil in x-axis and y-axis, respectively, as shown by dotted lines in FIG. 1.

In one non-limiting embodiment of the present disclosure, when the receiver antenna is perfectly aligned with the transmitter antenna, the dual mode transmitter antenna operates in mode 1 (i.e., only with primary coil) maximum power is transferred from the transmitter antenna to the receiver antenna and wireless power transmission (WPT) efficiency is maximum. When the receiver antenna is misaligned with the transmitter antenna, the receiver antenna does not receive the complete power transmitted from the transmitter antenna and the WPT efficiency decreases.

In another non-limiting embodiment of the present disclosure, in response to detection of misalignment between the receiver antenna and the transmitter antenna, the dual mode transmitter antenna operates in mode 2, in which the plurality of secondary coils are activated along with the primary coil. The plurality of secondary coils may generate an extensive uniform magnetic field. The primary and the plurality of secondary may be used to generate a widespread H-field to power misaligned Rx-coil, thereby increasing the WPT efficiency.

Figure 2:
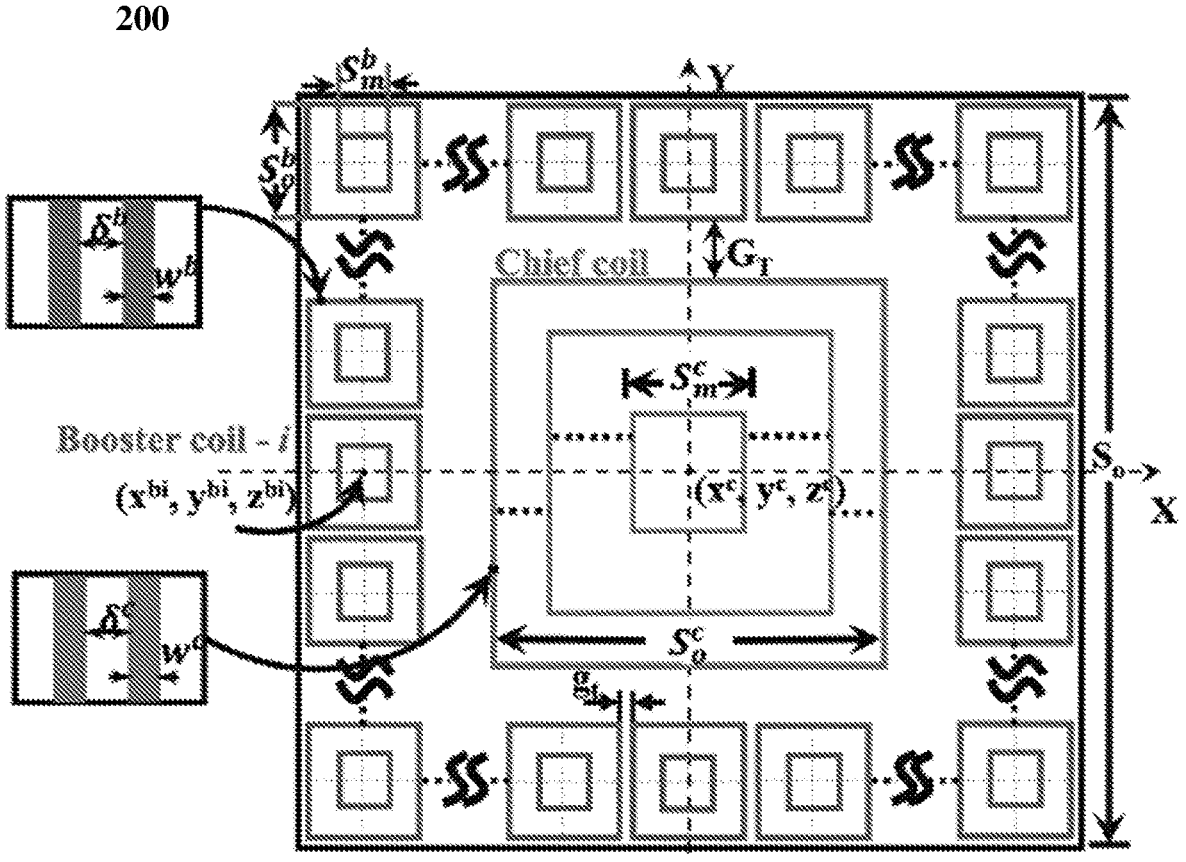
FIG. 2 shows an exemplary dual-mode transmitter antenna with non-uniform coil array for wireless power transmission, in accordance with an embodiment of the present disclosure.

FIG. 2 shows an exemplary dual-mode transmitter antenna 200 with non-uniform coil array for wireless power transmission, in accordance with an embodiment of the present disclosure.

In one non-limiting embodiment of the present disclosure, the chief coil or the primary coil is present at the center of the transmitter antenna and the booster coil or secondary coils surrounding the primary coil, which are located at the periphery of the dual-mode transmitter antenna, in a symmetrical format. The chief coil may comprise non-uniformly distributed turns along with anti-parallel turns for generating the concentrated uniform magnetic within a receiver antenna region. The secondary coils may comprise uniformly distributed turns to intensify a magnitude of the magnetic field near the boundary of the dual-mode transmitter antenna.

In an embodiment of the present disclosure, the dual mode transmitter antenna may be designed to operate in dual modes for optimal utilisation of H-field around the Rx-coil region by incorporating simple and two states of switching operation. The two state of switching operations are as follows:

The mode-1 consists of a chief coil centred at the location $(x^c, y^c, z^c)$ which is the same as the origin $(0, 0, 0)$ of the coordinate system. In this mode, only the chief coil is excited and is responsible to generate a concentrated H-field primarily around the aligned Rx region as marked in FIG. 1. The geometrical parameters of the chief coil include maximum side length $S_o^c$, minimum side length $S_m^c$, number of turns $N^c$, width of the conductive strip $w^c$, and inter-turn spacing, $\delta$. The side length of the n turn of the chief coil is determined as:

$$S = S_o^c - 2(n-1)(w+\delta) \forall n \in [1,N^c].$$

To form widespread uniform H-field around the misaligned Rx region (as marked in FIG. 1), the mode-2 contains booster coils as shown in FIG. 2 located around the border of the chief coil, in a symmetrical format. In this mode, both the coils are switched such that they are connected in series and are responsible to form an extensive uniform H-field in the Rx region to mitigate lateral misalignment problem. Let $n_b$ is the number of booster coils centred at locations $(x^{bi}, y^{bi}, 0) \forall i \in [1, n_b]$ encompassing the chief coil. Each booster coil-i has maximum side length $S_o^b$, minimum side length $S_m^b$, width of conductive strip $w$, inter-turn spacing $\delta$, number of turns $N$. The side length of the n turn is determined as:

$$S^{bi} = S^b - 2(n-1)(w^b + \delta^b) \forall n \in [1, N^{bi}] \text{ and } \forall i \in [1,n].$$

To apply the field forming technique, the H-field generated by the proposed Tx antenna is formulated subsequently. The H-field component along the z-direction due to a single-turn square coil carrying a current $I_T$ is formulated in [1]. At an observation point $(x, y, h)$, the H-field due to $n^{th}$ turn of any coil of the Tx antenna is given in the below equations:

$$H_n^t = \frac{I_T}{4\pi} \sum_{u=1}^{4} \left[ \frac{(-1)^u P_u}{r_u[r_u + (-1)^{u+1} Q_u]} - \frac{Q_u}{r_u[r_u + P_u]} \right], \tag{1}$$

$$r_1 = \sqrt{Q_1^2 + P_1^2 + h^2}, \ r_2 = \sqrt{Q_2^2 + P_2^2 + h^2},$$

$$r_3 = \sqrt{Q_3^2 + P_3^2 + h^2}, \ r_4 = \sqrt{Q_4^2 + P_4^2 + h^2},$$

$$Q_1 = -Q_4 = \frac{S_n^t}{2} + x - x^t, \ Q_2 = -Q_3 = \frac{S_n^t}{2} - x + x^t,$$

$$P_1 = P_2 = \frac{S_n^t}{2} + y - y^t, \ P_3 = P_4 = -\frac{S_n^t}{2} + y - y^t.$$

where $t \Leftarrow c$ and $t \Leftarrow bi$ represents H-field due to chief coil and booster coil-i, respectively, and their positions are defined as $(x^t, y^t, 0)$ from FIG. 2. The distance between the Tx and the Rx coil is h. The total H-field, $H_{eff}$ in the misaligned Rx region is the superposition of the individual H-fields due to all the turns of the chief coil as well as the booster coils and obtained as shown in below equations:

$$H^c = \sum_{n=1}^{N^c} H_n^c \chi_n^c, \tag{2a}$$

$$H^b = \sum_{i=1}^{n_b} \sum_{n=1}^{N^{bi}} H_n^{bi} \gamma_0^b, \tag{2b}$$

$$H_{eff} = H^c + H^b, \tag{2}$$

where $H_c$ and $H_b$ are calculated to be individual H-field distributions due to chief coil and booster coils, respectively. The coefficients $\chi_n^c$ and $\gamma_o^b$ are defined to optimise the Tx for the proposed H-field forming. $\chi_n^c=0, \pm1$ is characterised as coefficient of current circulation in the nth turn of the chief coil which permits the optimisation to reveal a non-uniform distribution of the turns along with anti-parallel turns to achieve the targeted H-field uniformity within the Rx region. The $\chi_n^c=0$ means absence of the turn-n and $\chi_n^c=+1$ and $\chi_n^c=-1$ represent current in opposite circulation.

Whereas the booster coils are constrained to acquire uniformly distributed turns to intensify the magnitude of H-field near the border of the Rx region. Therefore, the non-zero positive integer $\gamma_o^b$ is defined as a boosting factor which is characterised to support the amplification of the H-field in the misaligned Rx region.

For instance, $\gamma_o^b=1$ implies the H-field due to multi-turn booster coils, whereas $\gamma_o^b>1$ signifies the requirement of a $\gamma_o^b$ times more H-field by the booster coils. The multiplying effect in practice can be realised by feeding the booster coils separately with a source having $\gamma_o^b$ times magnitude of the current ($\gamma_b^b I_T$).

The system 100 becomes complex if we increase the number of feeding ports to feed the booster coils separately from the chief coil. This results in a cost inefficient design. Therefore, for instance to realise $\gamma_o^b=2$, the number of booster coils is doubled or by using a double-sided PCB. Hence, the booster coils are placed at z=0 plane and their replicas are etched on z=1.6 mm plane.

In an embodiment of the present disclosure the design constraints and parameters of the Tx antenna may be calculated as follows:

The physical parameters which are constrained to have a defined value based on fabrication limits and comparative study are $w^c$, $w^b$, $\delta^c$, $\delta^b$, the gap between two successive booster coils, $g_T$, and the maximum dimension, So, of the Tx shown in FIG. 2. Hence, the $S_o$ value constitutes the upper limit on the physical dimensions of the chief coil and the booster coils jointly as visualised in FIG. 2 by the relation:

$$S_o=S_o^c+2S_o^b+2G_T, \tag{3}$$

where, $G_T$ is the gap between the chief coil and the booster coils. The total number of booster coils $n_b$ relates to $S_o^c$, $G_T$, $\gamma_o^b$, and $g_T$ by formula:

$$n_b = \left\lfloor \frac{4(S_o - S_o^b)}{g_T + S_o^b} \gamma_o^b \right\rfloor \tag{4}$$

$$x^{bi} = \pm \frac{S_o^c + S_o^{bi}}{2} + G_T \text{ and } y^{bi} = \pm \frac{S_o^c + S_o^{bi}}{2} + G_T \tag{5}$$

Hence the total number of coils, $n_T$, in the Tx is $n_T=n_b+1$. For the chief coil, vector $S_n^c$ represent side lengths of all the possible turns analytically considered in the optimisation. However, once values $\chi_n^c$ are known, the turns having $\chi_n^c=0$ do not exist physically. The absence of turns in $S_n^c$ implies a non-uniformly distributed turns profile of the Tx which is denoted as $S_n^{c*}$. The actual side length vector Sn c* of the optimised chief coil is given as:

$$S_n^c=|\chi_n^c|S_n^c=|\chi_n^c|(S_o^c-2(n-1)(w^c+\delta^c)) \tag{6}$$

where $$S_n^c=(S_o^c-2(n-1)(w^c+\delta^c)). \tag{7}$$

In the vector $S^{c*} \forall n \in [1, N^c]$, the gap between the values of successive turns is ($w^c+\delta^c$) and n the difference between successive non-zero values represents non-uniform turn spacing denoted as $\Delta_m$. The total number of turns in the realised chief coil and booster coils are determined as:

$$N^{c'} = \sum_{i=1}^{N^c} |\chi_n^c,| \tag{8a}$$

$$N^{bi} = \frac{S_o^b - S_m^b}{2(\delta^b + w^b)} + 1 \ \forall \ i \in [1, n_b]. \tag{8b}$$

The known parameters are first defined such as values of It, $S_o$, $g_T$, $w^c$, $w^b$, $S_m^c$, $S_m^b$, $\delta^c$ and $\delta^b$. For these given parameter values, other design parameters such as $x^{bi}$, $y^{bi}$, $N^{bi}$, $S_o^c$, $S_o^b$, $G_T$, $n_b$, $\chi^c$, $\gamma^b$, $S^c$, $S^{c'}$, $N^{c'}$, and $\Delta^c$ are optimised. Since the design parameters are inter dependent by relations (3)-(8), the only design parameters available for optimisation are $S_o^c$ and $\chi^c$ for the chief coil, and $x^{bi}$, $y^{bi}$, $S_o^b$, and $\gamma_o^b$ for booster coils. The optimisation of these two groups of coils is not independent and constrained by (3).

Figure 3A:
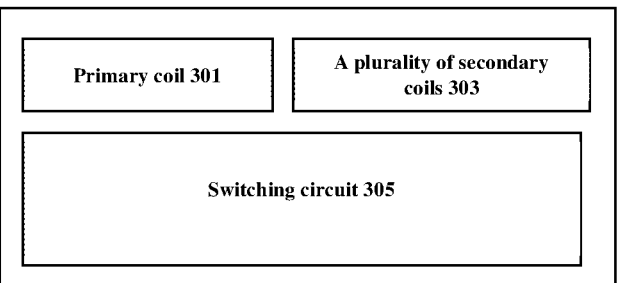
FIG. 3(*a*) shows a block diagram of a dual-mode transmitter antenna with non-uniform coil array for wireless power transmission, in accordance with an embodiment of the present disclosure.
Figure 3B:
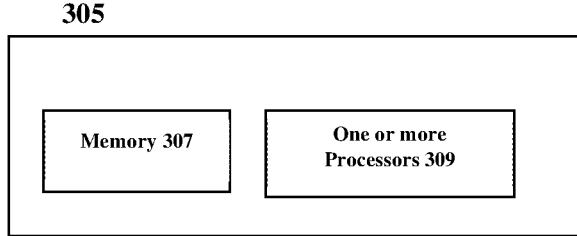

FIG. 3(*a*) shows a block diagram of a dual-mode transmitter antenna 300 with non-uniform coil array for wireless power transmission and FIG. 3(*b*) shows a block diagram of a switching circuit 305, in accordance with an embodiment of the present disclosure;

In an embodiment of the present disclosure, a dual-mode transmitter antenna 300 with non-uniform coil array for wireless power transmission is disclosed. The dual mode antenna 300 may comprise a primary coil 301 located at center of the dual-mode transmitter antenna. The primary coil 301 may be configured to generate concentrated uniform magnetic field in a first mode and a second mode of operation. Thus, primary coil 301 of the dual-mode transmitter antenna operates in both the modes.

In an embodiment of the present disclosure, the dual mode antenna 300 may further comprise a plurality of secondary coils 303 that surrounds the primary coil 301 and located at the periphery of the dual-mode transmitter antenna 300, as shown in FIGS. 1 and 2, in a symmetrical format. The plurality of secondary coils 303 may be configured to generate an extensive uniform magnetic field.

In an embodiment of the present disclosure, the dual mode antenna 300 may further comprise a switching circuit 305 electrically coupled to the primary coil 301 and the plurality of the secondary coils 303. The switching circuit 305 may be configured to detect a lateral misalignment between the dual-mode transmitter antenna 300 and a receiver antenna and activate the plurality of secondary coils 305 in the second mode of operation in response to detecting lateral misalignment between the dual-mode transmitter antenna and the receiver antenna. The primary and the plurality of secondary coil may be configured to generate a widespread H-field to power misaligned Rx-coil, thereby stabilizing the WPT efficiency of the WPT system.

In an embodiment of the present disclosure, the switching circuit 305 may comprise a memory 307 and one or more processors 309 in communication with each other. The one or more processors 309 may be configured to detect the lateral misalignment based on a comparison of voltage induced at receiver with a predetermined threshold induced voltage value. The predetermined threshold induced voltage may be set based on data received from receiver regarding induced voltage under perfectly aligned condition. The voltage induced under perfectly aligned conditions may be considered as predetermined threshold induced voltage. In one non-limiting embodiment, a reduction in induced voltage (e.g., 1%) may be considered to be the triggering point to switch the dual mode transmit antenna in the second mode of operation.

In an embodiment of the present disclosure, the dual-mode transmitter antenna 300 may be operated in the first mode if the dual-mode transmitter antenna 300 and receiver antenna are perfectly aligned in lateral direction and the dual-mode transmitter antenna 300 may be operated in the second mode if the lateral misalignment between the dual-mode transmitter antenna and the receiver antenna is detected. The plurality of secondary coils are connected in series with the primary coil when the dual-mode transmitter antenna is operated in the second mode.

In an embodiment of the present disclosure, the secondary coils may comprise uniformly distributed turns to intensify a magnitude of the magnetic field near the boundary of the dual-mode transmitter antenna in the second mode. The primary coil may comprise non-uniformly distributed turns along with anti-parallel turns for generating the concentrated uniform magnetic within a receiver antenna region.

In an embodiment of the present disclosure, the switching circuit 305 may be further configured to deactivate the plurality of secondary coils upon detecting that the dual-mode transmitter antenna and the receiver antenna are perfectly aligned in lateral direction. The deactivation the plurality of secondary coils may facilitate reduction in wastage of magnetic flux when the dual mode transmitter antenna is perfectly aligned with the receiver antenna.

FIG. 4 shows a flow chart illustrating an exemplary method 400 for wireless power transmission, in accordance with an embodiment of the present disclosure.

At block 401, the method 400 discloses generating concentrated uniform magnetic field in a first mode and a second mode of operation by a primary coil. The primary coil may be located at the center of a dual-mode transmitter antenna. The primary coil may operate irrespective of the lateral alignment between the dual mode transmitter antenna and the receiver antenna.

At block 403, the method 400 discloses detecting a lateral misalignment between the dual-mode transmitter antenna and the receiver antenna. In one non-limiting embodiment of the present disclosure, the lateral misalignment between the dual-mode transmitter antenna and the receiver antenna may be detected based on a comparison of voltage induced at receiver with a predetermined threshold induced voltage value.

The predetermined threshold induced voltage may be set based on data received from receiver regarding induced voltage under perfectly aligned condition. The voltage induced under perfectly aligned conditions may be considered as predetermined threshold induced voltage. In one non-limiting embodiment, a reduction in induced voltage (e.g., 1%) may be considered to be the triggering point to switch the dual mode transmit antenna in the second mode of operation.

At block 405, the method 400 discloses activating a plurality of secondary coils in the second mode of operation in response to detecting the lateral misalignment between the dual-mode transmitter antenna and the receiver antenna. If the lateral misalignment between the dual-mode transmitter antenna and the receiver antenna is detected. The dual mode transmit antenna is switched to second mode of operation. The plurality of secondary coils are activated in the second mode of operation.

At block 407, the method 400 discloses generating, by the plurality of secondary coils, an extensive uniform magnetic field. The method 400 further discloses operating the dual-mode transmitter antenna in the first mode if the dual-mode transmitter antenna and receiver antenna are perfectly aligned in lateral direction and operating the dual-mode transmitter antenna in the second mode if the lateral misalignment between the dual-mode transmitter antenna and the receiver antenna is detected.

In one non-limiting embodiment, the step of activating the plurality of secondary coils in the second mode of operation may comprise connecting the plurality of secondary coils in series with the primary coil. The primary and the plurality of secondary coil may generate a widespread H-field to power misaligned Rx-coil, thereby stabilizing the WPT efficiency of the WPT system.

In an embodiment of the present disclosure, the step of generating the extensive uniform magnetic field may comprise intensifying a magnitude of magnetic field near the boundary of the dual-mode transmitter antenna in the second mode of operation using uniformly distributed turns of each of the plurality of secondary coils.

In an embodiment of the present disclosure, the step of generating the concentrated uniform magnetic field comprises generating concentrated uniform magnetic field within a receiver antenna region using non-uniformly distributed turns along with anti-parallel turns of the primary coil.

In an embodiment of the present disclosure, the method 400 further discloses deactivating the plurality of secondary coils when the dual-mode transmitter antenna and the receiver antenna are perfectly aligned in lateral direction. The deactivation of the plurality of secondary coils may facilitate reduction in wastage of magnetic flux when the dual mode transmitter antenna is perfectly aligned with the receiver antenna.

In an embodiment of the present disclosure, the steps of method 400 may be performed in an order different from the order described above.

Figure 5:
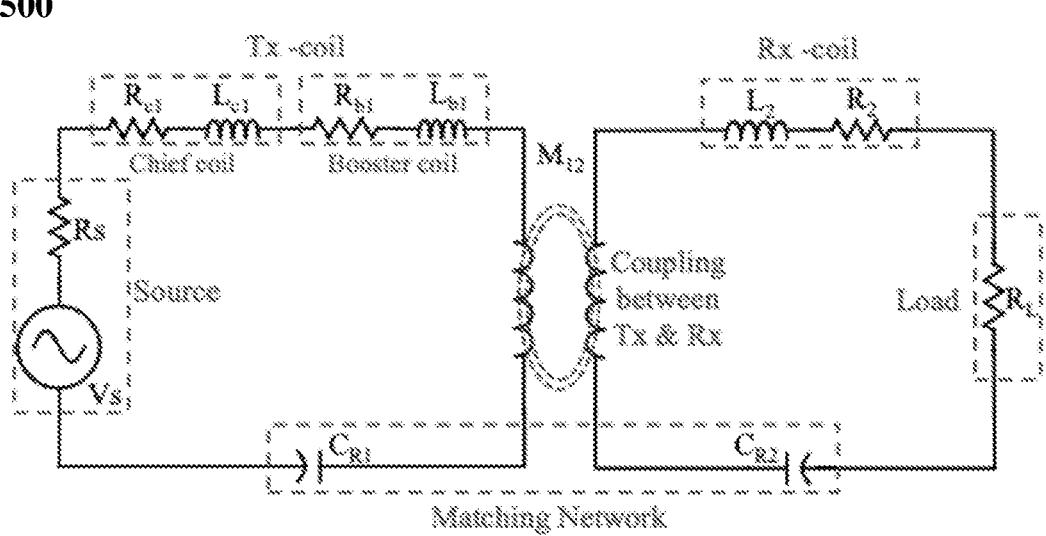
FIG. 5 illustrates an equivalent circuit diagram for wireless power transmission, in accordance with an embodiment of the present disclosure.

FIG. 5 illustrates an equivalent circuit diagram for wireless power transmission, in accordance with an embodiment of the present disclosure.

In an embodiment of the present disclosure, the circuit 500 may comprise a source, a dual mode transmitter antenna including a transmitter (Tx) coil and a receiver antenna having a receiver (Rx) coil. The Tx-coil comprises a chief or a primary coil having resistance $R_{C1}$ and inductance $L_{C1}$. The Tx-coil also comprises a plurality of secondary coils or booster coil in series with primary coil. The booster coil having a resistance of $R_{b1}$ and inductance $L_{b1}$. The Tx-coil is connected with a voltage source Vs having a resistance Rs.

The Rx coil comprises an inductance $L_2$ and a resistance $R_2$. The Rx coil is connected to load having a resistance $R_L$. The Tx-coil and Rx coil comprises capacitance $C_{R1}$ and $C_{R2}$ respectively to form a matching network. The Tx-coil and Rx coil are connected such that a mutual inductance $M_{12}$ is induced between the dual mode transmitter antenna and receiver antenna.

In an embodiment of the present disclosure, the circuit 500 may be configured to perform the method 400 as described in above embodiments.

FIG. 6(*a*) shows a dual-mode transmitter antenna layout from front view, in accordance with an embodiment of the present disclosure. The chief coil or the primary coil is present at the center and the booster coil or the secondary coils are present at the periphery of the PCB.

The primary coil comprises non-uniformly distributed turns along with anti-parallel turns for generating the concentrated uniform magnetic field within a receiver antenna region. The plurality of secondary coils comprise uniformly distributed turns to intensify a magnitude of the magnetic field near the boundary of the dual-mode transmitter antenna in the second mode.

FIG. 6(*b*) shows a dual-mode transmitter antenna layout from back view, in accordance with an embodiment of the present disclosure. In an embodiment of the present disclosure, the plurality of secondary coils may also be present at the back side of the PCB for generating a widespread H-field to power misaligned Rx-coil, thereby increasing the power transmission efficiency of the WPT system.

FIG. 6(*c*) shows a layout of a primary coil, in accordance with an embodiment of the present disclosure. FIG. 6(*c*) indicates the non-uniformly distributed turns i.e., the distance between the turns is non-uniform. FIG. 6(*d*) shows a layout of a secondary coil, in accordance with an embodiment of the present disclosure. As shown in FIG. 6(*d*), the plurality of secondary coils comprise uniformly distributed turns i.e., the distance between the turns is uniform. The size of the plurality of secondary coils are such that the secondary coils are accommodated within the same PCB without increasing the size of the transmitter antenna.

Figure 7:
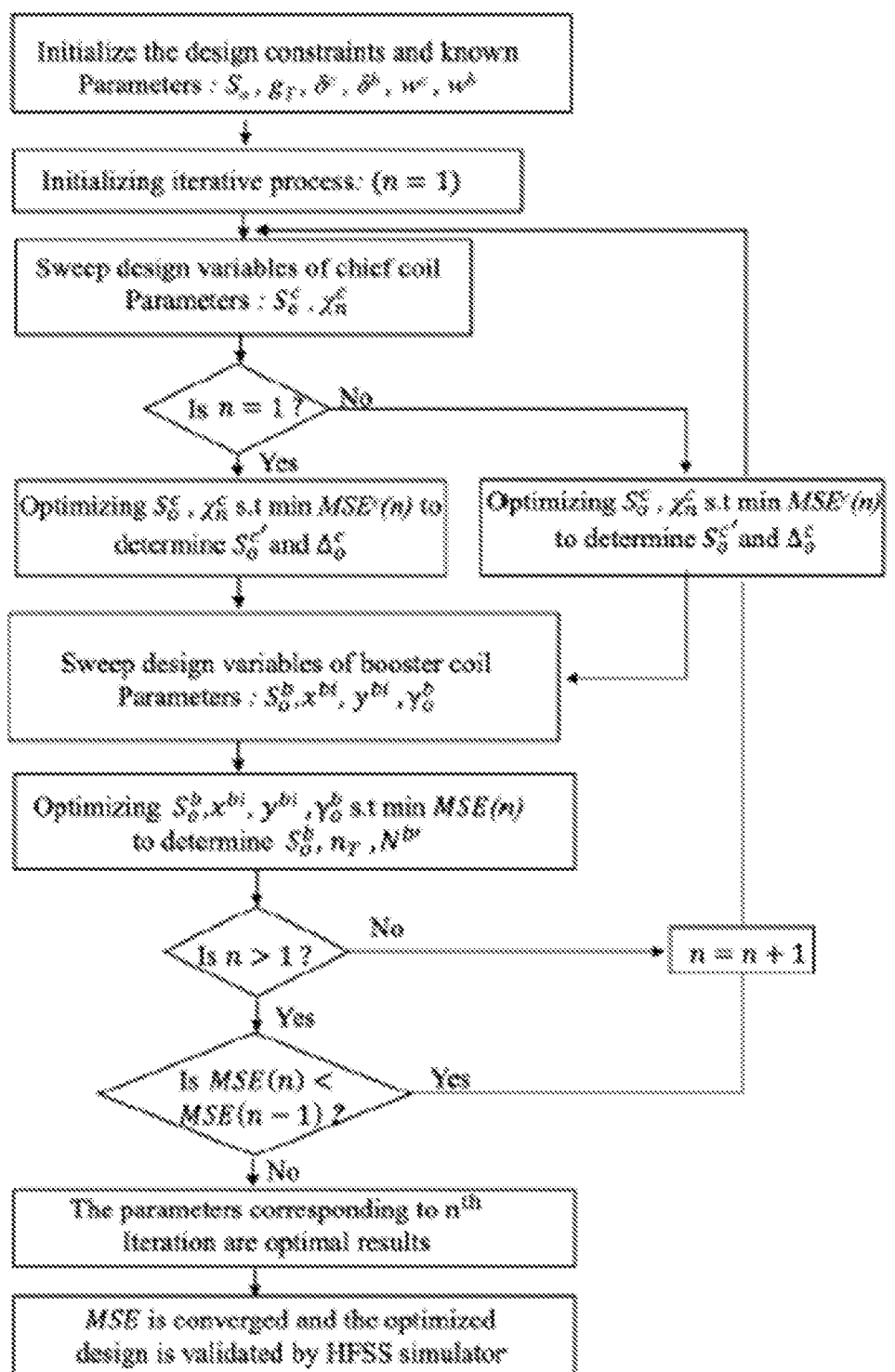
FIG. 7 illustrates a flowchart for optimizing parameters of the dual-mode transmitter antenna, in accordance with an embodiment of the present disclosure.

FIG. 7 illustrates a flowchart for optimizing parameters of the dual-mode transmitter antenna, in accordance with an embodiment of the present disclosure.

In an embodiment of the present disclosure, an iterative design technique based on minimum Mean Square Error (MSE) optimisation is adopted and summarised in the flow chart. The iterative design technique starts with the set of design constraints and initial values (as discussed above in FIG. 2) and terminates with the optimal geometrical parameters of the dual-mode antenna. By sweeping the design parameters in the optimisation procedure, the optimal results can be obtained.

The iterative design technique is as follows:

Step-1: The known parameters are initialised.

Step-2: The chief coil optimisation process is initiated in the first iteration based on minimum MSE problem defined in equation (9) below:

$$\min_{S_o^c, \mathcal{X}_n^c} MSE^c = \overline{[H^c(S_o^c, \mathcal{X}_n^c) - H_T^c]^2} \tag{9}$$

$$\text{s.t. } S_m^c \le S_o^c \le S_o, \mathcal{X}_n^c \in [-1, 0, 1]$$

By initialising and sweeping design variables So and $\chi_n$. Let the So and progressively stored in MSEc vector. The design parameters corresponding to minimum {MSEc} are evaluated as sub-optimised chief coil parameters.

Step-3: The sub-optimum $S_o^c$ and $\chi_c$ results are used in equations (6) and (7) to determine non-uniform side length profile $S_c^*$ and spacing $\Delta^c$ of the chief coil. The $N^{c'}$ is also determined using equation (8).

Step-4: The booster coils are optimised based on minimum MSE problem defined in equation (10) below:

$$\min_{S_o^b, x^{bi}, y^{bi}, \gamma_o^b} MSE = \overline{[H_{eff}(S_o^b, x^{bi}, y^{bi}, \gamma_o^b) - H_T]^2} \tag{10}$$

$$\text{s.t. } S_m^b \le S_o^b \le \frac{S_o - S_o^c}{2}, \gamma_o^b \ge 1$$

By initialising and sweeping design variables $S_o^b$, $x^{bi}$, $y^{bi}$ and $\gamma_o^b$ for the fixed sub-optimised chief coil. The GT is determined using equation (3) for different values of $S_o^b$ where the value of So c is fixed to sub-optimum value obtained in Step-2. Let the $S_o^b$ be a vector. For each index of $S_o^b$ vector MSE is evaluated as per equation (12) for $\gamma_o^b \ge 1$. The result is stored for each index in vector MSE. The value of minimum {MSE} is stored in MSE(n) for nth iteration of the algorithm and corresponding design parameters are extracted to form a sub-optimised BOOSTENNA design.

Step-5: The $S_o^b$, $G_T$ and $\gamma_o^b$ are used to determine $n_b$ from (4) and the $N^{c'}$ and $N^{bi}$ are obtained from equation (8).

Step-6: The Step-2 to Step-5 are repeated for several iterations until minimum MSE converges i.e., MSE(n)=MSE(n−1). The parameters of the chief coil and the booster coils corresponding to the final iteration are obtained as optimal geometrical parameters. The resultant optimised design produced as an output of the iterative design technique.

The one or more processors 307 may comprise a memory and communication interface. The memory may be software maintained and/or organized in loadable code segments, modules, applications, programs, etc., which may be referred to herein as software modules. Each of the software modules may include instructions and data that, when installed or loaded on a processor and executed by the processor, contribute to a run-time image that controls the operation of the processors. When executed, certain instructions may cause the processor to perform functions in accordance with certain methods and processes described herein.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Exemplary embodiments discussed above may provide certain advantages. Though not required to practice aspects of the disclosure, these advantages may include those provided by the following features.

In an embodiment, the present disclosure mitigates lateral misalignment problem between the transmitter and receiver coil in WPT applications.

In an embodiment, the dual-mode transmitter antenna with non-uniform coil array for wireless power transmission increases power transfer efficiency (PTE) of the WPT system without increasing the size of the transmitter antenna.

In an embodiment, the described techniques may be realized at a low cost as its switching circuitry implementation is simpler.

In an embodiment, the dual-mode transmitter antenna with non-uniform coil array for wireless power transmission reduces wastage of flux when the dual mode transmitter antenna is perfectly aligned with the receiver antenna.

The invention claimed is:

1. A dual-mode transmitter antenna with non-uniform coil array for wireless power transmission, the dual mode antenna comprising:
   a primary coil located at a center of the dual-mode transmitter antenna, wherein the primary coil is configured to generate uniform magnetic field in a first mode and a second mode of operation, and wherein the primary coil operates in both the first mode and the second mode of operation;
   a plurality of secondary coils surrounding the primary coil and located at the periphery of the dual-mode transmitter antenna, wherein the primary coil and the plurality of secondary coils are configured to receive power from a power source; and
   a switching circuit electrically coupled to the primary coil and the plurality of the secondary coils, wherein the switching circuit is configured to:
      detect a lateral misalignment between the dual-mode transmitter antenna and a receiver antenna; and
      activate the plurality of secondary coils in the second mode of operation in response to detecting lateral misalignment between the dual-mode transmitter antenna and the receiver antenna;
   wherein the plurality of secondary coils are configured to generate uniform magnetic field that extends around a periphery of the uniform magnetic field generated by the primary coil.

2. The dual-mode transmitter antenna as claimed in claim 1, wherein the dual-mode transmitter antenna is operated in the first mode when the dual-mode transmitter antenna and receiver antenna are perfectly aligned in lateral direction, and wherein the dual-mode transmitter antenna is operated in the second mode when the lateral misalignment between the dual-mode transmitter antenna and the receiver antenna is detected, and wherein the plurality of secondary coils are connected in series with the primary coil when the dual-mode transmitter antenna is operated in the second mode.

3. The dual-mode transmitter antenna as claimed in claim 1, wherein each of the plurality of secondary coils comprise uniformly distributed turns to intensify a magnitude of the magnetic field near the boundary of the dual-mode transmitter antenna in the second mode.

4. The dual-mode transmitter antenna as claimed in claim 1, wherein the primary coil comprises non-uniformly distributed turns along with anti-parallel turns for generating the uniform magnetic within a receiver antenna region.

5. The dual-mode transmitter antenna as claimed in claim 1, wherein the switching circuit is further configured to:
   deactivate the plurality of secondary coils upon detecting that the dual-mode transmitter antenna and the receiver antenna are perfectly aligned in lateral direction.

6. A method for wireless power transmission, the method comprising:
   generating, by a primary coil, uniform magnetic field in a first mode and a second mode of operation, wherein the primary coil is located at the center of a dual-mode transmitter antenna, and wherein the primary coil operates in both the first mode and the second mode of operation;
   detecting a lateral misalignment between the dual-mode transmitter antenna and a receiver antenna, wherein the primary coil and a plurality of secondary coils receive power from a power source;
   activating the plurality of secondary coils in the second mode of operation in response to detecting the lateral misalignment between the dual-mode transmitter antenna and the receiver antenna, wherein the plurality of secondary coils surrounds the primary coil and located at the periphery of the dual-mode transmitter antenna; and
   generating, by the plurality of secondary coils, uniform magnetic field that extends around a periphery of the uniform magnetic field generated by the primary coil.

7. The method as claimed in claim 6, further comprising:
   operating the dual-mode transmitter antenna in the first mode when the dual-mode transmitter antenna and receiver antenna are perfectly aligned in lateral direction; and
   operating the dual-mode transmitter antenna in the second mode when the lateral misalignment between the dual-mode transmitter antenna and the receiver antenna is detected,
   wherein activating the plurality of secondary coils in the second mode of operation comprises connecting the plurality of secondary coils in series with the primary coil.

8. The method as claimed in claim 6, wherein generating the uniform magnetic field comprises intensifying a magnitude of magnetic field near the boundary of the dual-mode transmitter antenna in the second mode of operation using uniformly distributed turns of each of the plurality of secondary coils.

9. The method as claimed in claim 6, wherein generating the uniform magnetic field comprises generating uniform magnetic field within a receiver antenna region using non-uniformly distributed turns along with anti-parallel turns of the primary coil.

10. The method as claimed in claim 6, further comprising:
deactivating the plurality of secondary coils when the
   dual-mode transmitter antenna and the receiver antenna
   are perfectly aligned in lateral direction.

* * * * *